(12) United States Patent
Berg et al.

(10) Patent No.: US 12,483,272 B2
(45) Date of Patent: Nov. 25, 2025

(54) ENCODING AND DECODING COMPLEX DATA

(71) Applicant: Telefonaktiebolaget LM Ericsson (publ), Stockholm (SE)

(72) Inventors: Miguel Berg, Sollentuna (SE); Per Ola Börjesson, Mörrum (SE); Chenguang Lu, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 187 days.

(21) Appl. No.: 18/276,066

(22) PCT Filed: Feb. 18, 2021

(86) PCT No.: PCT/SE2021/050138
§ 371 (c)(1),
(2) Date: Aug. 7, 2023

(87) PCT Pub. No.: WO2022/177481
PCT Pub. Date: Aug. 25, 2022

(65) Prior Publication Data
US 2024/0120941 A1    Apr. 11, 2024

(51) Int. Cl.
*H03M 7/30* (2006.01)
*G06F 17/14* (2006.01)
(Continued)

(52) U.S. Cl.
CPC ......... *H03M 7/6011* (2013.01); *G06F 17/141* (2013.01); *H03M 5/14* (2013.01);
(Continued)

(58) Field of Classification Search
CPC ............. H03M 7/6011; H03M 7/3062; H03M 7/6005; H03M 7/3068; H03M 7/40; H03M 5/14; G06F 17/141
See application file for complete search history.

(56) References Cited

U.S. PATENT DOCUMENTS 7,088,276 B1 * 8/2006 Wegener ............... G06F 17/141
341/51
7,136,010 B2 * 11/2006 Cirillo .................... G01S 7/003
342/25 R
(Continued)

FOREIGN PATENT DOCUMENTS

EP          3065324 A1    9/2016
WO       91/16769 A1    10/1991
WO    2018/106155 A1    6/2018

OTHER PUBLICATIONS

International Search Report and Written Opinion of the International Searching Authority, PCT/SE2021/050138, mailed Nov. 1, 2021 12 pages.
(Continued)

*Primary Examiner* — Khai M Nguyen
(74) *Attorney, Agent, or Firm* — Sage Patent Group

(57) ABSTRACT

It is provided a method for encoding complex data. The method includes the steps of: obtaining an input signal made up of a series of numerically represented samples; determining a time frame of the input signal to process; applying a first window function on data in the time frame, resulting in first windowed data, wherein the first window function tapers sample magnitude towards the edges of the first window function; performing a windowed complex discrete Fourier-related transform on the first windowed data, resulting in frequency-domain data including a plurality of coefficients, keeping only the real part or the imaginary part of each coefficient; quantizing the frequency domain data resulting in quantized data; outputting the quantized data as encoded data; and repeating the method, wherein each subsequent iteration of the step of determining a time frame includes determining a time frame that overlaps in time with a preceding time frame.

19 Claims, 8 Drawing Sheets

(51) Int. Cl.
*H03M 5/14* (2006.01)
*H03M 7/40* (2006.01)
(52) U.S. Cl.
CPC ....... *H03M 7/3062* (2013.01); *H03M 7/3068* (2013.01); *H03M 7/40* (2013.01); *H03M 7/6005* (2013.01)

(56) References Cited

U.S. PATENT DOCUMENTS

| | | |
|---|---|---|
| 2013/0030819 A1 | 1/2013 | Purnhagen et al. |
| 2013/0246074 A1 | 9/2013 | Taleb |
| 2020/0313692 A1 | 10/2020 | Berg et al. |
| 2020/0322204 A1 | 10/2020 | Lu et al. |
| 2020/0372923 A1 | 11/2020 | Helmrich et al. |

OTHER PUBLICATIONS

Extended European Search Report mailed Oct. 21, 2024 for European Patent Application No. 21926954.5, 6 pages.

* cited by examiner

ENCODING AND DECODING COMPLEX DATA

CROSS REFERENCE TO RELATED APPLICATIONS

This application is a 35 U.S.C. § 371 national stage application of PCT International Application No. PCT/SE2021/050138 filed on Feb. 18, 2021, the disclosure and content of which is incorporated by reference herein in its entirety.

TECHNICAL FIELD

The present disclosure relates to the field of encoding and decoding and in particular to encoding and decoding complex data.

BACKGROUND

There are many different ways to encode and compress data. For instance, compression is beneficial for data containing complex samples for wireless communication compressing. Such samples are represented as complex IQ (in-phase quadrature) samples.

For instance, such data can be compressed from a source with memory (resulting in correlation between samples) by resampling to a lower sampling frequency, closer to the Nyquist limit, optionally followed by quantization to fewer number of bits per sample. This commonly is known to be used to compress fronthaul signals (e.g. with the Common Public Radio Interface (CPRI)) between a baseband processing unit (Radio Equipment Controller, REC) and a peripheral radio unit (Radio Equipment, RE).

However, resampling to a lower sampling frequency is not effective for signals with frequency-domain gaps, e.g. a sampled representation of the instantaneous bandwidth (IBW) for a cellular band. Further, aggressive resampling close to the Nyquist limit requires long FIR (Finite Impulse Response) filters, which results in high computational complexity.

SUMMARY

One object is to improve encoding and compression of data made up of a series of numerically represented samples.

According to a first aspect, it is provided a system for encoding and decoding complex data. The system comprises an encoder and a decoder. The encoder comprises: a processor; and a memory storing instructions that, when executed by the processor, cause the encoder to: obtain an input signal made up of a series of numerically represented samples; determine a time frame of the input signal to process; apply a first window function on data in the time frame, resulting in first windowed data, wherein the first window function tapers sample magnitude towards the edges of the first window function; perform a windowed complex discrete Fourier-related transform on the first windowed data, resulting in frequency-domain data comprising a plurality of coefficients, keeping only the real part or the imaginary part of each coefficient; quantize the frequency domain data resulting in quantized data; output the quantized data as encoded data; and repeat the instructions of the encoder, wherein in each subsequent iteration of instructions to determine, a time frame is determined that overlaps in time with a most recent preceding time frame. The decoder comprises: a processor; and a memory storing instructions that, when executed by the processor, cause the decoder to: obtain the encoded data for a time frame of data; unpack quantization performed by the encoder; perform a windowed complex inverse discrete Fourier-related transform on the unpacked data, resulting in time-domain data; apply a fourth window on the time-domain data, resulting in fourth windowed data, wherein the fourth window function is determined based on the first window function; add, in corresponding time units, the fourth windowed data to previously determined overlapping fourth windowed data of a preceding time frame; output, as output data, the added data for time units for which all encoded data has been processed; and repeat the instructions of the decoder, wherein in each subsequent iteration of the instructions to obtain encoded data for a time frame is obtained that overlaps in time with a most recent preceding time frame.

According to a second aspect, it is provided a method for encoding complex data. The method is performed in an encoder. The method comprises the steps of: obtaining an input signal made up of a series of numerically represented samples; determining a time frame of the input signal to process; applying a first window function on data in the time frame, resulting in first windowed data, wherein the first window function tapers sample magnitude towards the edges of the first window function; performing a windowed complex discrete Fourier-related transform on the first windowed data, resulting in frequency-domain data comprising a plurality of coefficients, keeping only the real part or the imaginary part of each coefficient; quantizing the frequency domain data resulting in quantized data; outputting the quantized data as encoded data; and repeating the method, wherein each subsequent iteration of the step of determining a time frame comprises determining a time frame that overlaps in time with a most recent preceding time frame.

The step of performing a windowed complex discrete Fourier-related transform may comprise applying a time shift to align aliases between neighbouring time frames.

The step of performing a windowed complex discrete Fourier-related transform may comprise applying a frequency shift.

The method may further comprise the step of: discarding coefficients in the second windowed data that are likely to be less than a threshold.

The method may further comprise the step of: scaling frequency components in the second windowed data.

The method may further comprise the step of: entropy encoding the quantized data; in which case the step of outputting comprises outputting the entropy encoded quantized data.

The overlap may be 50 percent of a time frame length, i.e. 50 percent of the mentioned time frame.

The samples may be IQ, in-phase and quadrature, samples of a baseband signal for wireless communication.

According to a third aspect, it is provided an encoder for encoding complex data. The encoder comprises: a processor; and a memory storing instructions that, when executed by the processor, cause the encoder to: obtain an input signal made up of a series of numerically represented samples; determine a time frame of the input signal to process; apply a first window function on data in the time frame, resulting in first windowed data, wherein the first window function tapers sample magnitude towards the edges of the first window function; perform a windowed complex discrete Fourier-related transform on the first windowed data, resulting in frequency-domain data comprising a plurality of coefficients, keeping only the real part or the imaginary part of each coefficient; quantizing the frequency domain data resulting in quantized data; output the quantized data as encoded data; and repeat said instructions, wherein each subsequent iteration of the instructions to determine a time frame comprise instructions that, when executed by the processor, cause the encoder to determine a time frame that overlaps in time with a most recent preceding time frame.

The instructions to perform a windowed complex discrete Fourier-related transform may comprise instructions that, when executed by the processor, cause the encoder to applying a time shift to align aliases between neighbouring time frames.

The instructions to perform a windowed complex discrete Fourier-related transform may comprise instructions that, when executed by the processor, cause the encoder to apply a frequency shift.

The encoder may further comprise instructions that, when executed by the processor, cause the encoder to: discard coefficients in the second windowed data that are likely to be less than a threshold.

The encoder may further comprise instructions that, when executed by the processor, cause the encoder to: scale frequency components in the second windowed data.

The encoder may further comprise instructions that, when executed by the processor, causes the encoder to: entropy encode the quantized data; in which case the instructions to output comprise instructions that, when executed by the processor, cause the encoder to output the entropy encoded quantized data.

The overlap may be 50 percent of a time frame length.

The samples are IQ, in-phase and quadrature, samples of a baseband signal for wireless communication.

According to a fourth aspect, it is provided a computer program for encoding complex data. The computer program comprises computer program code which, when executed on an encoder causes the encoder to: obtain an input signal made up of a series of numerically represented samples; determine a time frame of the input signal to process; apply a first window function on data in the time frame, resulting in first windowed data, wherein the first window function tapers sample magnitude towards the edges of the first window function; perform a windowed complex discrete Fourier-related transform on the first windowed data, resulting in frequency-domain data comprising a plurality of coefficients, keeping only the real part or the imaginary part of each coefficient; quantizing the frequency domain data resulting in quantized data; output the quantized data as encoded data; and repeat said instructions, wherein each subsequent iteration of the instructions to determine a time frame comprise instructions that, when executed by the processor, cause the encoder to determine a time frame that overlaps in time with a most recent preceding time frame.

According to a fifth aspect, it is provided a computer program product comprises a computer program according to the fourth aspect and a computer readable means on which the computer program is stored.

According to a sixth aspect, it is provided a method for decoding encoded complex data. The method is performed in a decoder. The method comprises the steps of: obtaining encoded data for a time frame of data; unpacking quantization performed by the encoder; performing a windowed complex inverse discrete Fourier-related transform on the unpacked data, resulting in time-domain data; applying a fourth window on the time-domain data, resulting in fourth windowed data, wherein the fourth window function is determined based on a first window function applied in generating the encoded data; adding, in corresponding time units, the fourth windowed data to previously determined overlapping fourth windowed data of a preceding time frame; outputting, as output data, the added data for time units for which all encoded data has been processed as a series of numerically represented samples; and repeating the method, wherein each subsequent iteration of the step of obtaining comprises obtaining encoded data for a time frame that overlaps in time with a most recent preceding time frame.

The step of performing a windowed complex inverse discrete Fourier-related transform may comprise reversing a time shift applied in generating the encoded data.

The step of performing a windowed complex inverse discrete Fourier-related transform may comprise applying a frequency shift.

The method may further comprise the step of: rescaling frequency components, to reverse corresponding scaling performed for the encoded data.

The method may further comprise the step of: entropy decoding the quantized data.

The overlap may be 50 percent of a time frame length.

The samples may be IQ, in-phase and quadrature, samples for a baseband signal for wireless communication.

According to a seventh aspect, it is provided a decoder for decoding encoded complex data. The decoder comprises: a processor; and a memory storing instructions that, when executed by the processor, cause the decoder to: obtain encoded data for a time frame of data; unpack quantization performed by the encoder; perform a windowed complex inverse discrete Fourier-related transform on the unpacked data, resulting in time-domain data; apply a fourth window on the time-domain data, resulting in fourth windowed data, wherein the fourth window function is determined based on a first window function applied in generating the encoded data; add, in corresponding time units, the fourth windowed data to previously determined overlapping fourth windowed data of a preceding time frame; output, as output data, the added data for time units for which all encoded data has been processed as a series of numerically represented samples; and repeat said instructions, wherein each subsequent iteration of the instructions to of obtaining comprises obtaining encoded data for a time frame that overlaps in time with a most recent preceding time frame.

The instructions to perform a windowed complex inverse discrete Fourier-related transform may comprise instructions that, when executed by the processor, cause the decoder to reverse a time shift applied in generating the encoded data.

The instructions to perform a windowed complex inverse discrete Fourier-related transform may comprise instructions that, when executed by the processor, cause the decoder to apply a frequency shift.

The decoder may further comprise instructions that, when executed by the processor, cause the decoder to: rescale frequency components, to reverse corresponding scaling performed for the encoded data.

The decoder may further comprise instructions that, when executed by the processor, cause the decoder to: entropy decode the quantized data.

The overlap is 50 percent of a time frame length.

The samples may be IQ, in-phase and quadrature, samples for a baseband signal for wireless communication.

According to an eighth aspect, it is provided a computer program for decoding encoded complex data. The computer program comprises computer program code which, when executed on a decoder causes the decoder to: obtain encoded data for a time frame of data; unpack quantization performed by the encoder; perform a windowed complex inverse discrete Fourier-related transform on the unpacked data, resulting in time-domain data; apply a fourth window on the time-domain data, resulting in fourth windowed data, wherein the fourth window function is determined based on a first window function applied in generating the encoded data; add, in corresponding time units, the fourth windowed data to previously determined overlapping fourth windowed data of a preceding time frame; output, as output data, the added data for time units for which all encoded data has been processed; and repeat said instructions, wherein each subsequent iteration of the instructions to of obtaining comprises obtaining encoded data for a time frame that overlaps in time with a most recent preceding time frame.

According to a ninth aspect, it is provided a computer program product comprising a computer program according to the eighth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
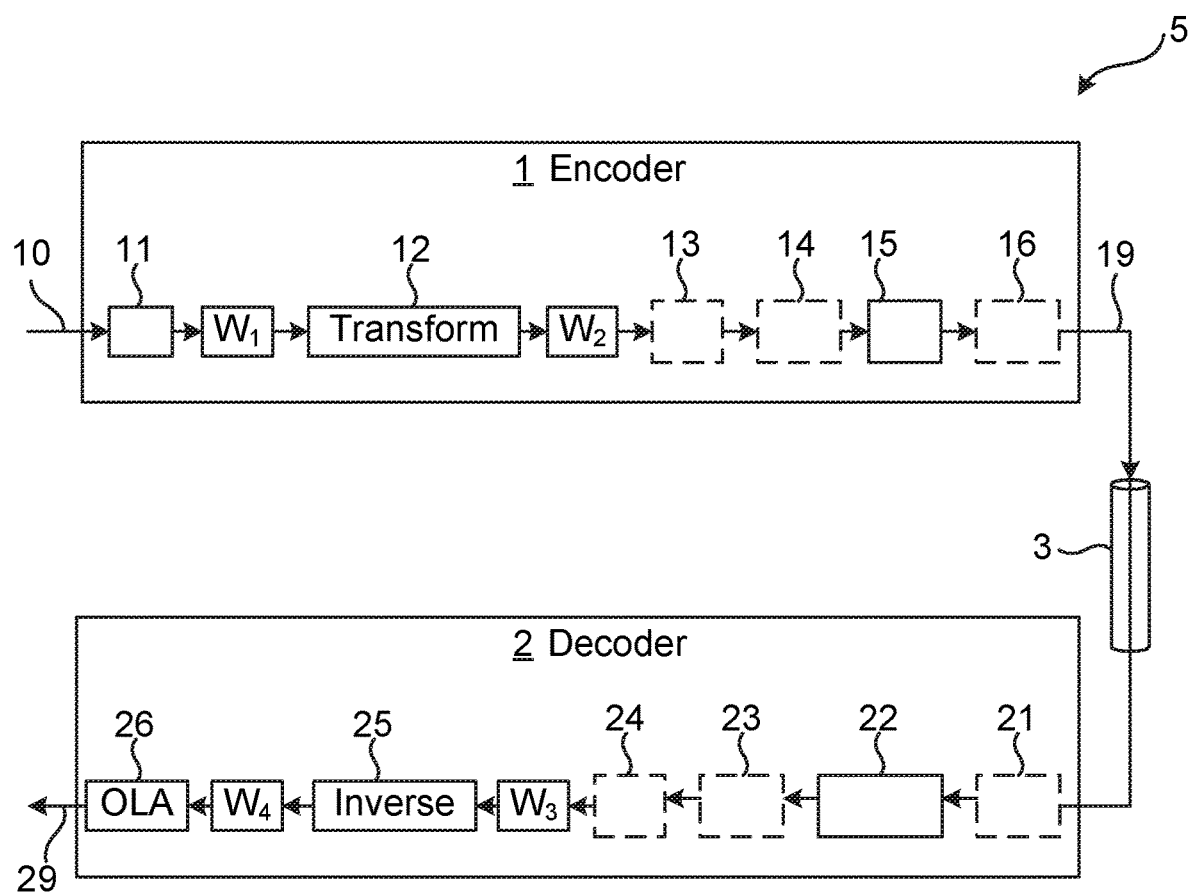
FIG. 1 is a schematic diagram illustrating encoding and decoding of data according to some embodiments.

FIG. 1 is a schematic diagram illustrating encoding and decoding of data according to some embodiments, in a system 5 comprising an encoder 1 and a decoder 2. Input data 10 is in the form of numerically represented samples of complex data. The input data is provided to the encoder 1 which outputs encoded data 19. The encoded data 19 is provided though a communication channel 3 to the decoder 2. The decoder 2 takes the encoded data 19 as input and outputs reconstituted data 29 in the form of numerically represented samples of complex data. The compression is not lossless, so the reconstituted data 29, while in practice being the same as the input data 10, might not identical to the input data 10.

Looking now to functional units of the encoder 1, the encoder 1 comprises an input framer 11 that selects overlapping time frames of samples of the input data 10. A W1 module applies a first window function and a transform module performs a discrete Fourier-related transform. The Fourier-related transform (and corresponding inverse transform in the decoder) can e.g. be based on a fast Fourier transform (FFT), a discrete Fourier transform (DFT), generalized discrete Fourier transform (GDFT), etc. An optional discarder 13 discards bins that have low-magnitude numbers. An optional scaler 14 scales each bin to improve dynamic range. A quantizer 15 quantizes the data and an optional entropy encoder 16 entropy encodes the quantized data prior to output.

Looking to functional units of the decoder 2, the encoder comprises an optional entropy decoder 21, corresponding to the entropy encoder 16 when used, that entropy decodes the entropy encoded data. An unpacker 22 unpacks the quantized data. When the scaler 14 has been used in the encoder, the decoder comprises a rescaler 23 that restores the scaling performed by the encoder 1. When the discarder 13 has been used in the encoder, the decoder 2 comprises a corresponding filler 24 that fills zeroes in the bins that were discarded. A W3 module applies a third window which is an element-inverse function of the second window W2. An inverse module 25 performs an inverse discrete Fourier-related transform (in correspondence with the type of Fourier-related transform applied in the encoder) and a W4 module applies a fourth window. Since the time frames overlap, an OLA (overlap-add) module 26 adds, decoded values for the same time value across time frames, after which the decoded samples are output as reconstituted data 29.

Embodiments presented herein can e.g. be applied to fronthaul interfaces for distributed base stations, or to node-internal interfaces such as JESD204, which is commonly used between DFEs (Digital Front Ends) and DAC/ADC (Digital to Analogue Converter/Analogue to Digital Converters) or integrated RF (Radio Frequency) transceivers.

It is to be noted that multiple sets of encoded data, in data streams, can be aggregated in a single decoder. For instance, if the encoders are remote radio units operating as a shared cell for cellular radio, uplink radio signals from all remote radio units can be aggregated in a single central decoder 2. This aggregation can be frequency-selective, so that a given bin or group of bins may be discarded for one remote radio unit, e.g. due to the power being too low (only noise), or the power being too high (interference) but kept for another remote radio unit. With the transform coding, this aggregation can be performed in the transform domain (after unpacking the quantized data). This reduces the number of operations for inverse scaling, W3, inverse transform, W4 and OLA since these operations are performed once for the aggregate of the streams input to the decoder.

Figures 2A, 2B:
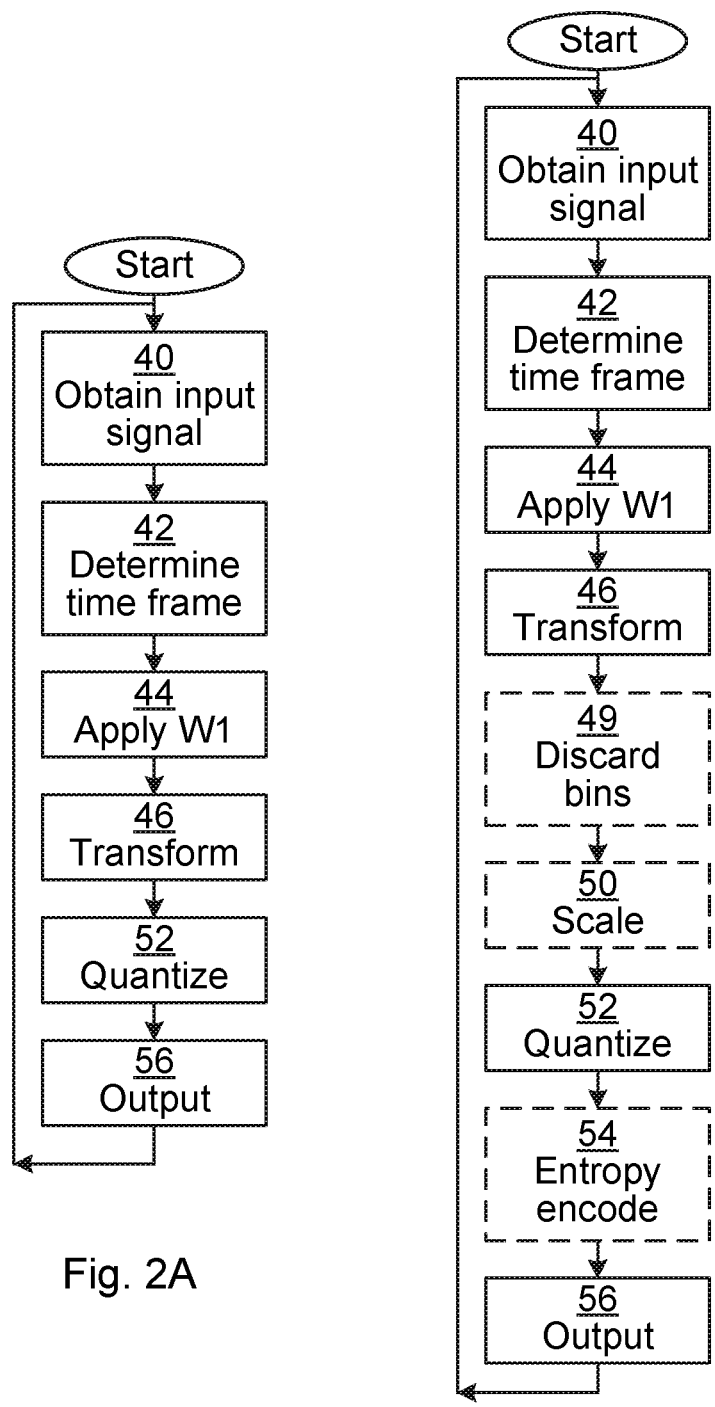
FIGS. 2A-B are flow charts illustrating embodiments of methods for encoding complex data performed in the encoder of FIG. 1.

FIGS. 2A-B are flow charts illustrating embodiments of methods for encoding complex data performed in the encoder of FIG. 1. First, methods illustrated by FIG. 2A will be described. It is to be noted that the transform is independent of carrier configuration while other parts may be adapted depending on e.g. placement of carriers (signals) in the frequency band.

In an obtain input signal step 40, the encoder 1 obtains an input signal 10 made up of a series of numerically represented samples. For instance, the samples can be IQ (in-phase and quadrature) samples of a baseband signal for wireless communication. The input signal can be made up of a single carrier as in CPRI, or multiple carriers that are multiplexed, as in a sampled instantaneous bandwidth (IBW) e.g. covering a whole cellular band.

In a determine time frame step 42, the encoder 1, determines a time frame of the input signal to process, see input framer 11 of FIG. 1.

In an apply W1 step 44, the encoder applies a first window function W1 on (complex) data in the time frame, resulting in first windowed data, see W1 module of FIG. 1. The first window function W1 tapers sample magnitude towards the edges of the first window function W1. The first window W1 can be a window with complex coefficients.

By attenuating the signal near frame edges, the first window reduces blocking artifacts. The first window W1 can further be arranged to have low energy in sidelobes. Furthermore, as explained in more detail below, the first window W1 is also used to enable time-domain alias cancellation by adjusting the phase of aliases so that consecutive frames have opposite sign for a given alias.

In one embodiment, the first window zero-pads at the end. This reduces latency, as described in more detail below, at the cost of increased spectral leakage or worse spectral resolution. This can be used e.g. for deployments that are latency constrained.

Figure 5A:
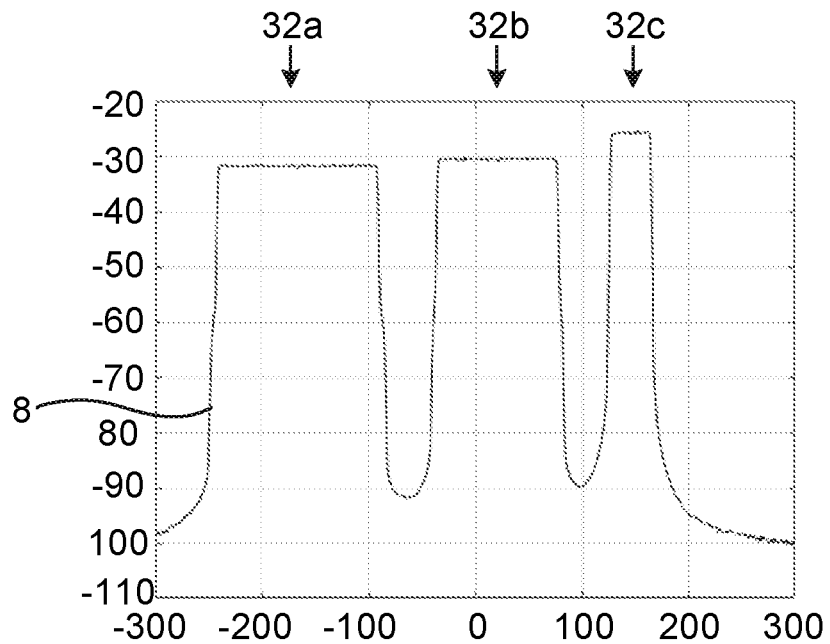
FIGS. 5A-B are schematic graphs illustrating frequency domain effects of encoding according to embodiments presented herein compared with the prior art.

In a transform step 46, the encoder performs a windowed complex discrete Fourier-related transform on the first windowed data, resulting in frequency-domain data comprising a plurality of coefficients, see transform module 12 and W2 in FIG. 1. The input is complex, and the coefficients can be complex. There can be different coefficients for positive and negative frequencies, the significance of which is illustrated in FIG. 5A and explained below. Only the real part or the imaginary part of each coefficient is kept, and the other part is discarded or never calculated.

Figure 3A:
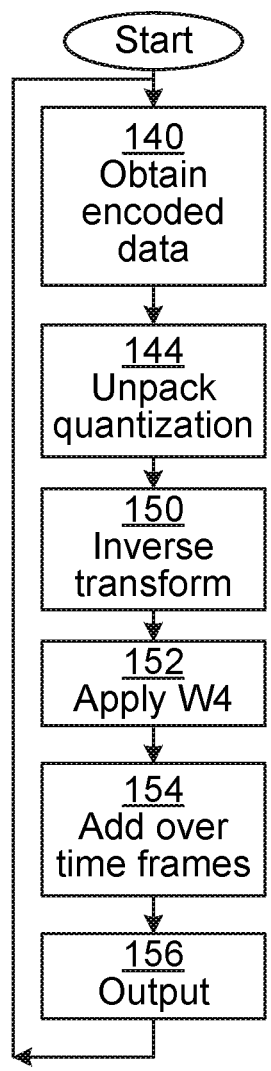
FIGS. 3A-B are flow charts illustrating embodiments of methods for decoding encoded complex data performed in the decoder of FIG. 1.
Figure 3B:
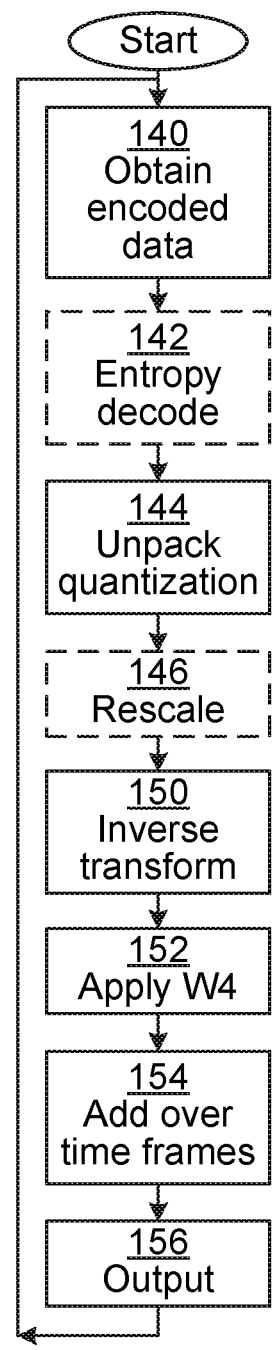

Discarding the real or imaginary part enables data compression since the overlap between time frames would otherwise yield data expansion. The discarding does create time domain aliases, but a time shift in W2, together with W3 in the decoder, ensure that time domain aliases are aligned in the overlap between consecutive frames, so that the aliases can be cancelled at the decoder output. In other words, this step can comprise applying a time shift to align aliases between neighbouring time frames, as seen in FIGS. 3A-C described below. As described in more detail below, the time shift can be applied using the second window function W2 or as part of the transform operations. Alternatively, the time shift can occur using buffer memory.

By removing the real or imaginary part, the number of real multiplications for the windowing operation can be reduced by half.

In a quantize step 52, the encoder quantizes the frequency domain data resulting in quantized data, see the quantizer 15 of FIG. 1. The quantization to fewer bits per sample, e.g. using block floating-point with 5 to 9 bit mantissa width for each bin coefficient and an exponent shared over multiple mantissa values. It is possible to combine block floating point with non-uniform quantization of the mantissa. Other alternatives such as vector quantization would also be possible.

Different quantization can be used for different bins. More bits can be allocated to bins with large dynamic range or large variance. For example, a digitally pre-distorted downlink signal may need large bit width inside the configured carrier bandwidth, while the pre-distortion outside the carrier can use fewer bits, to achieve better data compression.

For bins with very high SNR (signal-to-noise ratio) and/or dynamic range requirement, the quantization step can be skipped and the native output format from the transform can be used. Since this does not yield any data compression, this should only be used on a small subset of bins.

In an output step 56, the encoder outputs the quantized data as encoded data 19.

The method is then repeated. In each subsequent iteration of the determine time frame step 42, a time frame is determined that overlaps in time with a most recent preceding time frame. In one embodiment, the overlap is 50 percent of a time frame length.

Looking now to FIG. 2B, only new or modified steps compared to FIG. 2A will be described.

In an optional discard bins step 49, the encoder discards coefficients in the second windowed data that are likely to be less than a threshold, see the discarder 13 of FIG. 1. This process is also called bin nulling. The probability can be based on statistics of prior signal frequency distribution. One special case is where the probability is 100%, i.e. it is certain that the coefficient in one or more bins are less than the threshold, e.g. due to dynamic execution of this step based on the actual data from the transform.

In other words, the determination of what bins to keep and what bins to null can be semi-statically determined from carrier configuration and agreed with the decoder in the receiving node in advance. Alternatively, this is determined dynamically based e.g. on bin power. In the latter case, information about kept bins are sent in real-time to the decoder, e.g. using a bit mask or a set of ranges.

This step is beneficial when the signal does not occupy the whole sampled bandwidth. It achieves a similar effect as resampling closer to Nyquist in time domain, but here the complexity is much lower, and it is more flexible, since frequency gaps between signals can also be compacted.

When the determination of what bins are kept and what bins are nulled is predetermined, e.g. based on statistics of configuration, this can be used in determination of the second window W2 to save computations to only perform multiplication for bins that should be kept.

In an optional scale step 50, the encoder scales frequency components (bins) in the second windowed data, see the scaler 14 of FIG. 1 and discussion in relation to FIG. 6 below. If a shared scale factor/exponent, or some kind of vector quantization is used over multiple bins, it is possible to shape quantization noise by adjusting the scaling before quantization (and inverting the scaling in the decoder).

Optionally, the scaling of bins could be merged with W2 (and the inverted scaling merged with W3) if there is no need to have a transform block that is independent of carrier (signal) placement within the instantaneous bandwidth. This would reduce the number of computations further.

In an optional entropy encode step 54 the encoder entropy encodes the quantized data, see the entropy encoder 16 of FIG. 1. In this case, the output step 56 comprises outputting the entropy encoded quantized data.

The entropy encoding is, per se, lossless compression, but can still improve efficiency (lower output bitrate or allow more quantization levels). This step can be e.g. Huffman coding, range coding, and/or run-length coding.

FIGS. 3A-B are flow charts illustrating embodiments of methods for decoding encoded complex data performed in the decoder of FIG. 1.

In an obtain encoded data step 140, the decoder obtains encoded data for a time frame of data.

In an unpack quantization step 144, the decoder unpacks quantization performed by the encoder 1, see the unpacker 22 of FIG. 1. If any bins were discarded by the encoding, these are filled with zeros by the decoder.

It is to be noted that it is possible to fill with a different number of zeroes in the decoder, to thereby achieve resampling in the time domain. This is based on the decoder using a different transform size, and the windows in the decoder are then adjusted to account for the different transform size.

A time-domain resampler (typically using FIR-filters) could in this way be avoided when there is a need to change sample rate. Also, it may be an advantage to optimize transform size in the encoder (e.g. in a remote radio unit) according to supported bandwidth (least resource usage), while the decode end may use a larger transform size, covering many different bandwidths with a single transform size.

In an inverse transform step 150, the decoder performs a windowed complex inverse discrete Fourier-related transform on the unpacked data, resulting in time-domain data, see the W3 module and inverse module 25 of FIG. 1. The inverse transform is based on complex input data and complex output data.

In one embodiment, this step comprises reversing a time shift applied in generating the encoded data.

This step can include multiplication by a third window $W_3$, which is the element-wise inverse (or complex conjugate if magnitude equals 1) of $W_2$. This multiplication can be optimized since the input is real, while the output is complex (due to $W_3$). Further optimizations are possible if the information about kept bins is taken into account, since nulled bins would not have to be multiplied by the window.

In an apply W4 step 152, the decoder applies a fourth window W4 on the time-domain data, resulting in fourth windowed data, see the W4 module of FIG. 1. The fourth window function W4 is determined based on a first window function W1 applied in generating the encoded data. Together, all four windows ensure that we get perfect reconstruction (except for errors due to quantization and bin nulling).

In an add over time frames step 154, the decoder adds, in corresponding time units, the fourth windowed data to previously determined overlapping fourth windowed data of a preceding time frame, see the OLA module 26 of FIG. 1.

As described in more detail below, the overlap adding effectively cancels the aliases created when the imaginary (or real) part was discarded by the encoder.

In an output step 156, the decoder outputs, as output data, the added data for time units for which all encoded data has been processed, as a series of numerically represented samples. The samples can e.g. be IQ samples for a baseband signal for wireless communication.

The method is then repeated. In each subsequent iteration of the obtain encoded data step 140, encoded data is obtained for a time frame that overlaps in time with a most recent preceding time frame. For instance, the overlap can be 50 percent of a time frame length.

Looking not to FIG. 3B, only new or modified steps will be described.

In an optional entropy decode step 142, the decoder entropy decodes the quantized data, see the entropy decoder 21 of FIG. 1.

In an optional rescale step 146, the decoder rescales frequency components, to reverse corresponding scaling performed for the encoded data, see the rescaler 23 of FIG. 1.

Mathematical Model

The process of encoding and decoding will now be described with more mathematical rigour.

The transform coding used herein is based on the classical short time spectrum with the Discrete Fourier Transform (DFT).

$$X(k)=\text{DFT}\{a(n)\times(n)\}$$

where a(n) is an analysis time window of length N, the DFT size. Relating to FIG. 1, this corresponds to the first window $W_1$. In practice, the Fast Fourier Transform (FFT) can be used to calculate the Discrete Fourier Transform (DFT), to reduce computational complexity.

According to this method, the transform coefficients are the frequency values of the classical short time spectrum, where IDFT is the Inverse Discrete Fourier Transform:

$$y(n)=s(n)\cdot\text{IDFT}\{X(k)\}=s(n)\cdot a(n)\cdot x(n)$$

where y(n) reconstructs x(n) by means of overlapping by M (=N/2) as $$s(n)\cdot a(n)\cdot x(n)+s(n+M)\cdot a(n+M)\cdot x(n)=x(n)$$

if s(n) fulfils $$s(n)\cdot a(n)+s(n+M)\cdot a(n+M)=1$$

To get possibility for data compression, the number of samples in the frequency domain can be reduced by a factor of 2, by inverting only the real (or correspondingly imaginary) part of $W^*(k)X(k)$ as $$y(n)=s(n)\cdot\text{IDFT}\{W(k)\cdot\text{Re}[2\cdot W^*(k)X(k)]\}=s(n)\cdot a(n)\cdot x(n)$$

The last equality holds if the frequency window (corresponding to $W_3$)

$$W(k) = e^{i\frac{2\pi}{N}\left(\frac{M+1}{2}\right)k}$$

and if the synthesis time window s(n), corresponding to $W_4$, fulfils $$\begin{cases} s(n)\cdot a(n) + s(n+M)\cdot a(n+M) = 1, & n = 0, 1, \ldots, M-1 \\ s(n)\cdot a^*(M-1-n) + s(n+M)\cdot & n = 0, 1, \ldots, M-1 \\ \quad a^*(2M-1-n) = 0, & \end{cases}$$

Perfect reconstruction is achieved if the time shift is $$\frac{M+1}{2}$$

as in the equation for W(k) above. When inverting the real part, i.e.

$$Re[2 \cdot W^*(k)X(k)] = W^*(k)X(k) + W(k)X^*(k)$$

the term $W^*(k)X(k)$ gives the correct result, $y(n)=x(n)$, while inverting the conjugate term, $W(k)X^*(k)$, gives zero as result after adding the output from two consecutive frames overlapping by M samples. Time aliasing terms, due to using only the real part for the inverse, cancel each other when all the above window constraints are met.

Complex and asymmetrical windows can be used in the presented method. The time-window constraints could be written as $$\begin{cases} s(n) = \dfrac{a^*(2M-1-n)}{a(n)}, & n = 0, 1, \ldots, M-1 \\ s(n+M) = \dfrac{-a^*(M-1-n)}{a(n)}, & n+M = M, M+1 \ldots 2M-1 \end{cases}$$

where the denominator is $$d(n) = a(n)a^*(2M-1-n) - a(n+M)a^*(M-1-n).$$

Using this $s(n)$ as synthesis window, will give correct reconstruction for any complex $a(n)$, such that the denominator is nonzero for all n, i.e.

$$a(n)a^*(2M-1-n) \neq a(n+M)a^*(M-1-n)$$

For $$n = \frac{M-1}{2},$$

we have $$d(n) = a\left(\frac{M-1}{2}\right)a^*\left(\frac{3M-1}{2}\right) - a\left(\frac{3M-1}{2}\right)a^*\left(\frac{M-1}{2}\right) =$$

$$2i \cdot \text{Im}\left[a\left(\frac{M-1}{2}\right)a^*\left(\frac{3M-1}{2}\right)\right],$$

which is zero for odd M and real $a(n)$. This shows that $a(n)$ is complex, in order to avoid small absolute values (dips, even down to zero for odd M) in $d(n)$ for some n. For even M and practically usable real $a(n)$, there will also be dips for n close to $$\frac{M-1}{2}.$$

Deep dips in the denominator are undesirable since they yield a synthesis window, $s(n)$, with bad properties, including slow attenuation (spectral leakage) in the frequency domain; this may cause SNR degradation in conjunction with quantization or coefficient nulling.

Latency Reduction

It has already been shown above that best performance is achieved for complex $a(n)$. The time-window constraints above also support asymmetric windows. One practical use for asymmetric windows is latency reduction; by creating a shorter $a(n)$ and padding it with zeros at the end to length N, the overlap between frames decrease. This can be utilized to reduce latency without changing DFT size, at the cost of some degradation of spectral resolution or spectral leakage.

With zeros at the end of $a(n)$, the DFT in the encoder can start earlier since there is no need to wait for samples that will be zero after applying $a(n)$. Also, using the constraints for $s(n)$ above, $s(n)$ will have zeros in the beginning, which means that the decoder can output data earlier; More samples of a given frame can be output before starting overlap-add with the next decoded frame.

Design Choices

To get good energy compaction in the transform spectrum (e.g. for efficient data compression):

DFT($a(n)$) has low energy in its sidelobes and not too wide main lobe.

To get good frequency-domain properties after decoding:

$|d(n)|$ should be constant, or only have small variations with n. This could be obtained for $a(n)$ being complex-valued. However, there are several such $a(n)$. Below, some exemplary selections of $a(n)$ are provided.

Due to nulling of frequency bins and quantization applied to remaining bins in $X(k)$, which is not included in the equations above, some further cautions should be taken:

$\text{Re}[a(n)] \approx \text{Im}[a(n)]$ to avoid different quantization noise in the real and imaginary parts (I and Q) of the signal.

For downlink signals, design constraints can be derived from the desire to limit spectral leakage (emissions) outside the wanted signal (carriers), while maintaining a good SNR. The best SNR is achieved when $|d(n)|$ is constant. This may be important for downlink signals since peak user throughput requirements often have high priority.

For uplink signals, the width of the main lobe should be smaller than the frequency gap to the nearest strong interferer (e.g. on an adjacent channel) while the sidelobe level should be sufficiently low to suppress the interferer to a level where it only can cause small performance degradation (few percent). In uplink, selectivity requirements (rejection of unwanted interference outside the desired signal), may result in an $a(n)$ that does not give constant $|d(n)|$. This will mean a trade-off between selectivity and peak SNR.

One choice is to start with a real window $a_r(n)$, and create a complex $a(n)$ using the Hilbert transform $$a(n) = \text{hilbert}(a_r(n))$$

Another choice is to use the following structure where $a(n)$ is a (typically real-valued) window function $h_a(n)$ times a complex function $v^*(n)$ with constant magnitude:

$$\begin{cases} a(n) = h_a(n) \cdot v^*(n) \\ s(n) = h_s(n) \cdot v(n) \end{cases}$$

where $|v(n)|=1$. We can generate the phase of $v(n)$ in several ways.

One way to generate the phase is to start with a real-valued and non-negative $h_a(n)$ and then determine the phase of $v^*(n)$ by means of the Hilbert transform of the logarithm of the chosen value, i.e.

$$\angle v^*(n) = \text{Im}[\text{hilbert}(\log(h_a(n)))]$$

A second choice within this structure could be $$\angle v^*(n) = \begin{cases} +\frac{\pi}{4} & n < M \\ -\frac{\pi}{4} & n > M \\ 0 & \text{otherwise} \end{cases}$$

Both choices result in a non-linear phase for typical $h_a(n)$.

A further choice within this structure, having linear phase, is $$v(n) = e^{i\frac{B\pi}{N}n}, B \neq 0,$$

where selecting B as an odd integer, at least for even N, gives the least spectral leakage. Then we get the window conditions:

$$\begin{cases} h_s(n) = \dfrac{h_a^*(2M-1-n)}{h_a(n)h_a^*(2M-1-n) + h_a(n+M)h_a^*(M-1-n)}, & n = 0, 1, \ldots, M-1 \\ h_s(n+M) = \dfrac{h_a^*(M-1-n)}{h_a(n)h_a^*(2M-1-n) + h_a(n+M)h_a^*(M-1-n)}, & n+M = M, M+1 \ldots 2M-1 \end{cases}$$

If the windows are symmetric, i.e.

$$h_a(2M-1-n) = h_a(n)$$

the window conditions reduce to $$h_s(n) = \frac{h_a^*(n)}{|h_a(n)|^2 + |h_a(n+M)|^2}$$

If windows are both symmetric and real, the window conditions then further reduce to $$h_s(n) = \frac{h_a(n)}{h_a(n)^2 + h_a(n+M)^2}$$

In the formula for $v(n)$ earlier, B=1 might be suitable for real $h_a(n)$ since it yields a spectrum with equal number of bins for positive and negative frequencies after the DFT.

Another suitable value when N is even, is B=1+kN (k is an odd integer, e.g. k=1), which has the same property regarding the spectrum, but also swaps positive and negative frequencies after the transform so that frequencies near DC (direct current) will end up in the center of the spectrum. This may be beneficial for complex baseband signals, to see the spectrum as it would appear when upconverted to radio frequency.

Connecting back to the discussion of different requirements for downlink and uplink, the following choices may be beneficial In downlink, $h_a(n)$ could be selected as a Kaiser-Bessel Derived (KBD) window, e.g. with parameter $5 \leq \beta \leq 10$. For some applications, a Sine window may be sufficient, but typically KBD is an improvement since the sidelobe level can be tuned with β. Using the structure with any of the $v(n)$ above, $|d(n)|$ will be constant, resulting in best possible SNR, and we would get $h_s(n) = h_a(n)$.

In uplink, $h_a(n)$ could be selected as a Discrete Prolate Spheroidal Sequence (DPSS), having maximal energy concentration in the main lobe, or as a Kaiser window, which is easier to calculate and approximates the DPSS window. Suitable parameter for the Kaiser window could be e.g. $5 \leq \beta \leq 10$. Other windows with low sidelobes, such as Chebyshev windows, can also be used. In general, DPSS, Kaiser, and Chebyshev windows will not result in constant $|d(n)|$. This may result in a reduction of peak achievable SNR compared with e.g. KBD windows, which is a price to pay for improved selectivity. Here, $h_s(n) \neq h_a(n)$.

Implementation Options

If we choose $$v(n) = e^{i\frac{B\pi}{N}n}$$

as in one of the options described earlier, together with a real-valued $h_a(n)$, it is possible to use the Generalized Discrete Fourier Transform (GDFT) to avoid complex multiplication when applying the time-domain window a(n), and also to include the frequency-domain window W(k) and its conjugate in the transform, by proper setting of parameters. Further, it is also possible to include $v(n)$ in the transform, allowing real-valued a(n) and s(n) to be used without performance loss. By determining proper values of b, c, z, the following holds $$W^*(k)DFT\{h_a(n)v^*(n)x(n)\} =$$

$$z \cdot GDFT\{h_a(n)x(n), b, c\} = z \cdot \sum_{n=0}^{N-1} h_a(n)x(n)e^{-i\frac{2\pi}{N}(k+b)(n+c)}$$

Through identification we can determine that setting b=B/2 includes the effect of $v(n)$ in the GDFT, which means that it is enough to multiply with the real window $h_a(n)$ in time domain. Further, setting $$c = \frac{M+1}{2}$$

allows $W^*(k)$ to be included in the transform. Finally, we have the complex scale factor $$z = e^{i\frac{2\pi}{N}bc} = e^{i\frac{\pi B(M+1)}{2N}},$$

which might be possible to omit, at least if a corresponding change is done in the decoder.

The inverse transform can be implemented in a similar way using Inverse GDFT (IGDFT). Using GDFT (and inverse GDFT) mainly makes sense if a fast GDFT implementation is available. Otherwise, it may be preferred to use FFT to calculate the DFT, and keep the complex time and frequency-domain windows. Highly optimized FFT implementations are available in software or hardware on many platforms.

Interpretation of transform conditions and some examples are here provided for illustration.

Mapping the formulas above to the encoder and decoder yields:

$$\begin{cases} W_1 = h_a(n) \cdot v^*(n) \\ W_2 = W^*(k) \\ W_3 = W(k) \\ W_4 = h_s(n) \cdot v(n) \end{cases}$$

where scaling with some non-zero constant can be done if desired. Further, conjugate operations can be swapped between $W_1$ and $W_4$, as well as between $W_2$ and $W_3$ without affecting reconstruction. However, intermediate results would differ, which means that nulling (bin selection) and other operations may need adjustment.

Here, $v^*(n)$ ensures that time-domain aliases get proper phase to allow cancellation (opposite signs in consecutive overlapping frames). As mentioned earlier, constructing a(n) as a real window $h_a(n)$ (e.g. Kaiser, KBD, Sine window) multiplied by $v^*(n)$ as described above is only one example.

It could be noted that if $h_a(n)$ is real and $v^*(n)$ is absorbed into the FFT (e.g. by modifying the twiddle factors, resulting in a fast version of a GDFT as described above), only real multiplications are needed for $W_1$, which reduces computational complexity. The same goes for $W_4$ if $h_s(n)$ is real and v(n) is absorbed into the IFFT.

Windows $W_2$ and $W_3$ perform time shift of one half of a frame plus half one sample (M+1/2) in time domain. The result is that aliasing occurs around the center of the overlap area between two frames, instead of around the center of a transform result. This means that the aliases from the same part of the source signal are aligned in time between two consecutive frames. If GDFT is used, it may be possible to avoid explicit multiplication by windows $W_2$ and $W_3$, instead treating them as part of the transform, see above.

Figure 4A:
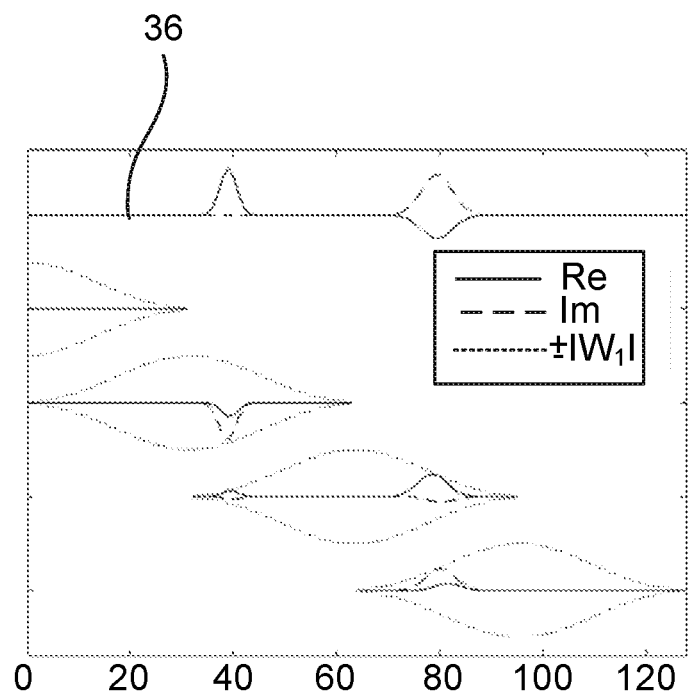
FIGS. 4A-C are schematic graphs illustrating various phases of encoding and decoding according to embodiments presented herein.
Figure 4B:
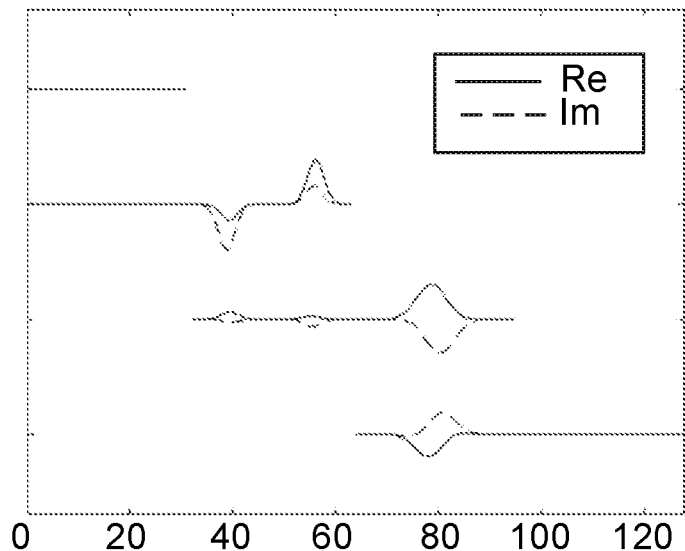
Figure 4C:
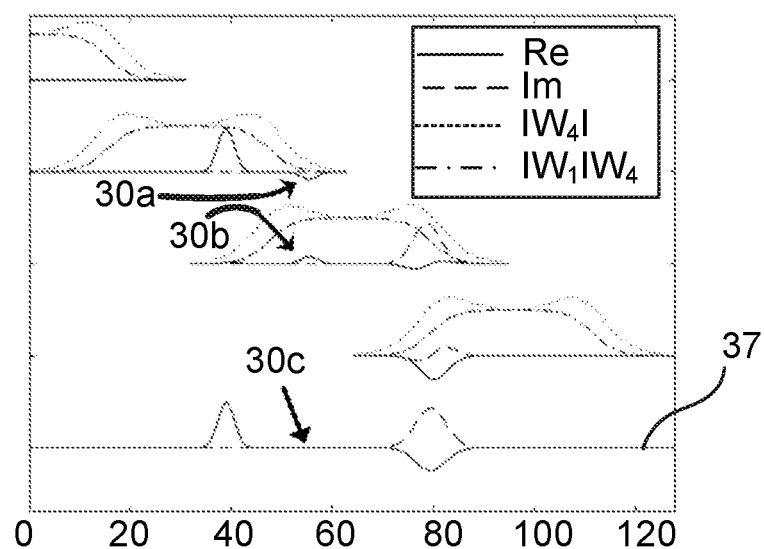

FIGS. 4A-C are schematic graphs illustrating various phases of encoding and decoding according to embodiments presented herein, for one example. In this example, the input frame size M=32, and the transform size N=64. No quantization is applied and all bins are kept in the transform domain since this result is mainly intended to show the time-domain aliasing cancellation. The horizontal axis indicates sample number and the vertical axis indicate amplitude of each signal.

In FIG. 4A, the top signal 36 is the source signal. The signals below that are those for consecutive time frames, after the first window W1 has been applied.

The source signal here consists of only two pulses: a real-valued gaussian pulse centered at sample 39, and a complex-valued gaussian pulse centered at sample 80. The analysis window, $h_a$, is a Kaiser window with parameter β=6. Note that certain window types will give equal $h_a$ and $h_s$ (e.g. Kaiser-Bessel derived windows). This does not apply for the Kaiser window, but when $h_s$ is calculated according to this invention, perfect reconstruction is still possible (disregarding rounding errors etc.) if bin domain coefficients are not altered.

The first window W1 is complex, whereby the resulting time frame signals have imaginary components also the real-only pulse.

In FIG. 4B, a result after the inverse transform is shown, but before the fourth window W4 is applied. Here, the aliasing, due to the removal of one part of complex coefficients, can be seen.

In FIG. 4C, the result after applying window W4 is seen. When the overlap of consecutive time frames is accumulated, aliases are cancelled. See e.g. the first alias 30a and the second alias 30b having opposite signs such that, when accumulated, this result in no contribution 30c in the reconstituted output signal 37.

Figure 5B:
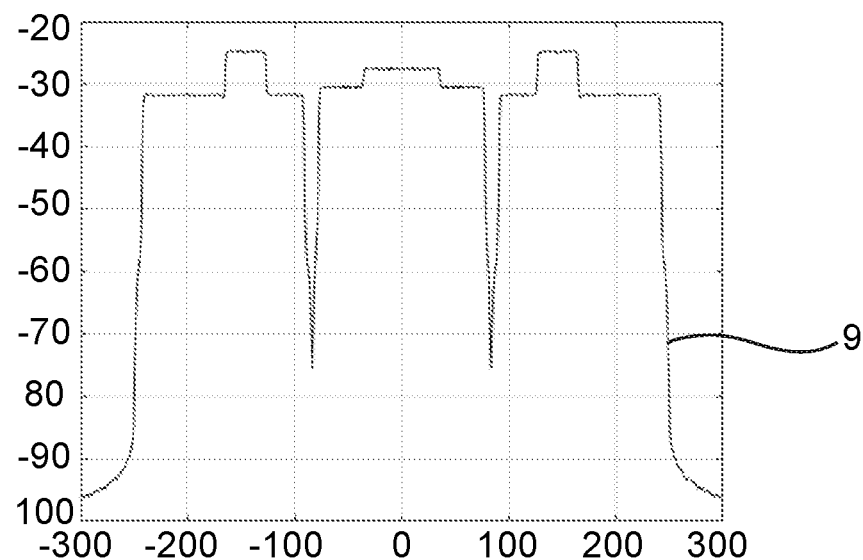

FIGS. 5A-B are schematic graphs illustrating frequency domain effects of encoding according to embodiments presented herein compared with the prior art. The horizontal axis represents frequency in terms of bin number and the vertical axis represents magnitude in dB.

When compressing signals that are not symmetric in frequency, a complex transform has the advantage that the power per transform bin still looks like the power spectral density of the signal, which is not true for the case when real transforms are used on I and Q separately. FIG. 5A shows an example of transform bin power for 120 kHz bin resolution in accordance with embodiments presented herein with a complex Fourier transform. The source signal consists of 3 LTE carriers 32a-c inside a 60 MHz wide band (LTE 20 MHz, gap 5 MHz, LTE 15 MHz, gap 5 MHz, LTE 5 MHz, and gap 10 MHz). As can be seen, the complex transform applied in FIG. 5A resolves the carriers and gaps nicely.

Looking now to FIG. 5B, this is based on if the transform is from separate real transforms on I and Q (right), where frequency domain aliasing occurs between negative and positive frequencies. Since negative frequencies are not possible in this case, the magnitude will be symmetrical around 0 Hz. Using real transforms instead of the complex transform would need 62% oversampling (~58 Msps effective sample rate) for the same carrier configuration.

The complex transform illustrated in FIG. 5A can effectively null the gaps between carriers, achieving a lower effective sample rate (better compression ratio) than the real transform. In this example, the scheduled carrier bandwidth is 36 MHz (excluding carrier guard intervals) and the effective transform sample rate (number of bins kept per second) is ~40 Msps (million samples per second), which corresponds to an oversampling of only 11%.

Figure 6:
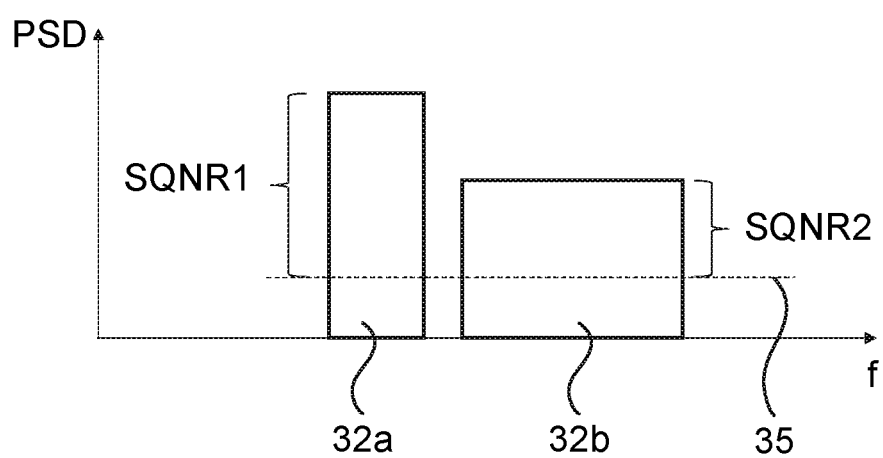
FIG. 6 is a schematic graph illustrating the value of scaling according to some embodiments presented herein.

FIG. 6 is a schematic graph illustrating the value of scaling according to some embodiments presented herein.

In order to approach Shannon's rate-distortion limit, a quantizer operates on a large block size (e.g. vector quantizers over many dimensions). Here, it is proposed to use block floating-point quantization with a shared exponent over many frequency bins. This can then be combined with entropy coding to get closer to the rate-distortion limit. Vector quantization could be used instead of separate quantization and entropy coding, but complexity is often high, and may not be feasible for the high sample rates that are typical in e.g. modern wireless communication systems such as 4G (fourth generation) LTE (long-term evolution) and 5G (fifth generation) NR (new radio).

If signals with low PSD (power spectral density) are frequency multiplexed together with signals having higher PSD in the same IQ sample stream, this can result in relatively more quantization noise for the signal with lower PSD 32b than the signal with higher PSD 32a, as shown in the FIG. 6.

In uplink, this might be acceptable, since thermal noise has a similar behaviour so that signals received with lower PSD will get lower SNR. However, in downlink, it may be desired to e.g. have equal SQNR (signal to quantization noise ratio) between carriers even if they have different PSD.

It is for this reason that optionally, bins are scaled to change the PSD before quantization in the encoder, and then change it back after unpacking quantization in the decoder. If it is desired to have the same SQNR for all signals, then bin scaling should be applied so that the PSDs become equal (amplify low PSDs, attenuate high PSDs). It is also possible to prioritize one part of the spectrum (e.g. a carrier) and keep a higher PSD so that it gets better SQNR than others.

For downlink, such bin scaling could be determined e.g. from individual carrier power and bandwidth relative to total power and bandwidth.

Apart from adjusting passband PSD for each carrier, another function of bin scaling is to improve unwanted emissions near the carrier edge, just outside the occupied bandwidth. This can be done by amplifying the edge bins (sloping part) for the wanted carriers a bit more than the flat part of the carriers, to reduce the relative quantization error for the carrier edges. In one example, OBUE (operating band unwanted emissions) margin improved from ~6 dB to 14 dB when bin scaling is enabled and includes shape compensation at the edges.

Figure 7:
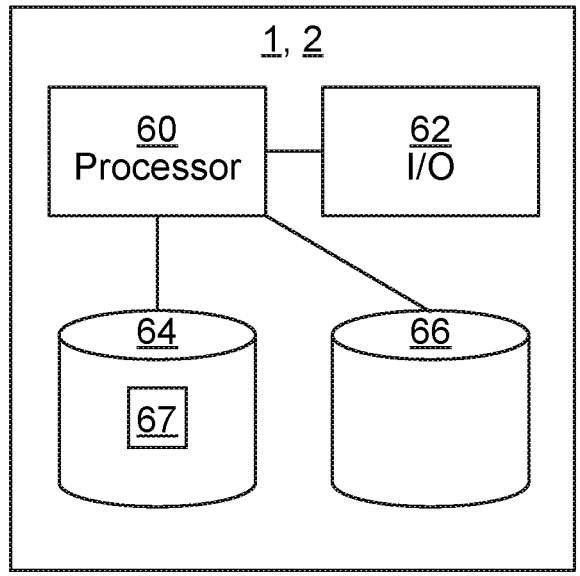
FIG. 7 is a schematic diagram illustrating components of the encoder and decoder of FIG. 1 according to some embodiments.

FIG. 7 is a schematic diagram illustrating components of the encoder and decoder of FIG. 1 according to some embodiments. It is to be noted that when the authentication device 1 is implemented in a host device, one or more of the mentioned components can be shared with the host device. A processor 60 is provided using any combination of one or more of a suitable central processing unit (CPU), graphics processing unit (GPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the methods described above with reference to FIG. 2A and FIG. 2B for the encoder FIG. 3A and FIG. 3B for the decoder.

The memory 64 can be any combination of random-access memory (RAM) and/or read-only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The encoder 1 and the decoder 2 further comprises an I/O interface 62 for communicating with external and/or internal entities. Optionally, the I/O interface 62 also includes a user interface.

Other components are omitted in order not to obscure the concepts presented herein.

Figure 8:
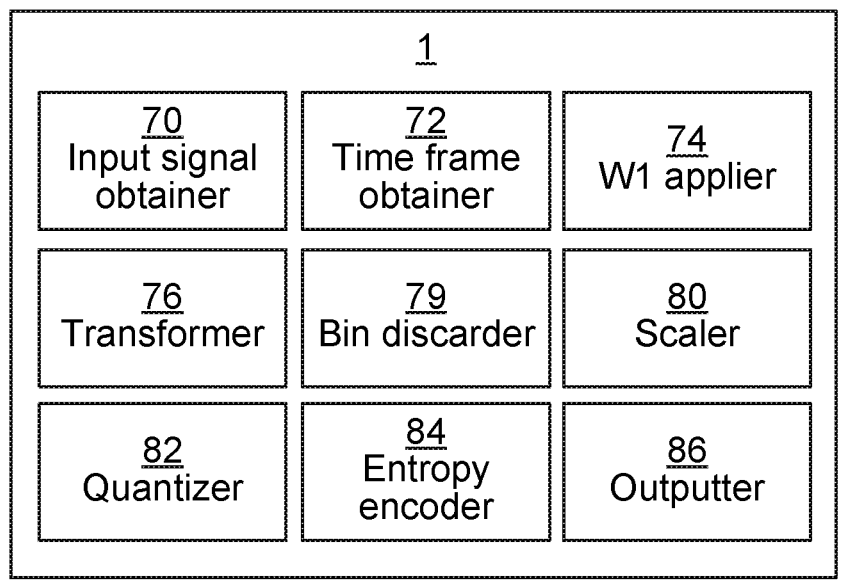
FIG. 8 is a schematic diagram showing functional modules of the encoder of FIG. 1 according to one embodiment.

FIG. 8 is a schematic diagram showing functional modules of the encoder 1 of FIG. 1 according to one embodiment. The modules are implemented using software instructions such as a computer program executing in the encoder 1. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 2A and 2B.

An input signal obtainer 70 corresponds to step 40. A time frame obtainer 72 corresponds to step 42. A W1 applier 72 corresponds to step 44. A transformer 76 corresponds to step 46. A bin discarder 79 corresponds to step 49. A scaler 80 corresponds to step 50. A quantizer 82 corresponds to step 52. An entropy encoder 84 corresponds to step 54. An outputter 86 corresponds to step 56.

Figure 9:
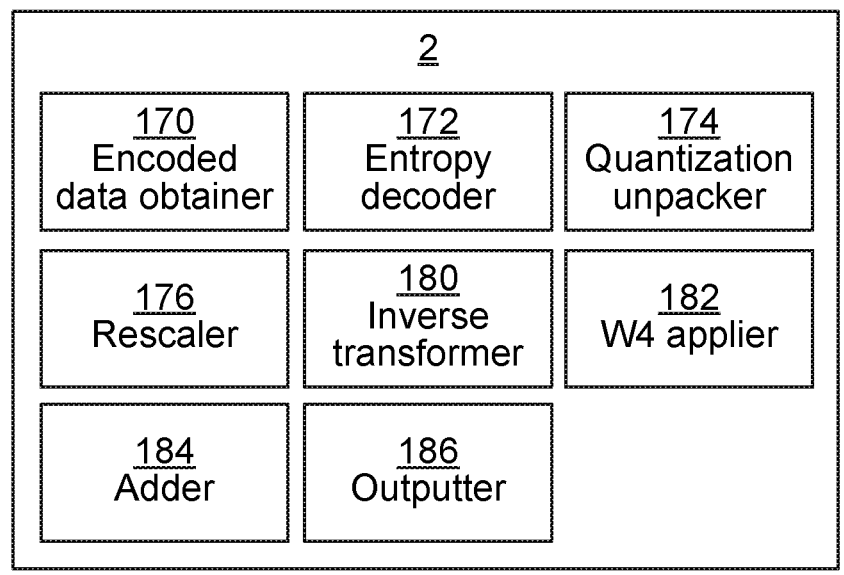
FIG. 9 is a schematic diagram showing functional modules of the decoder of FIG. 1 according to one embodiment.

FIG. 9 is a schematic diagram showing functional modules of the decoder 2 of FIG. 1 according to one embodiment. The modules are implemented using software instructions such as a computer program executing in the decoder 2. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 3A and 3B.

An encoded data obtainer 170 corresponds to step 140. An entropy decoder 172 corresponds to step 142. A quantization unpacker 174 corresponds to step 144. A rescaler 176 corresponds to step 146. An inverse transformer 180 corresponds to step 150. A W4 applier 182 corresponds to step 152. An adder 184 corresponds to step 154. An outputter 186 corresponds to step 156.

Figure 10:
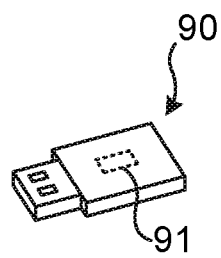
FIG. 10 shows one example of a computer program product comprising computer readable means.

FIG. 10 shows one example of a computer program product 90 comprising computer readable means. On this computer readable means, a computer program 91 can be stored, which computer program can cause a processor to execute a method according to embodiments described herein. In this example, the computer program product is in the form of a removable solid-state memory, e.g. a Universal Serial Bus (USB) drive. As explained above, the computer program product could also be embodied in a memory of a device, such as the computer program product 64 of FIG. 7. While the computer program 91 is here schematically shown as a section of the removable solid-state memory, the computer program can be stored in any way which is suitable for the computer program product, such as another type of removable solid-state memory, or an optical disc, such as a CD (compact disc), a DVD (digital versatile disc) or a Blu-Ray disc.

Using embodiments presented herein, low complexity and low power consumption is achieved. Since the embodiments are based on discrete Fourier transform, such as FFT, data compression is possible with lower complexity than time-domain resampling, especially for effective sample rates close to the Nyquist limit.

Moreover, filters are relaxed with these embodiments. Even with quantization as low as 5-6 bits per real sample, the invention can fulfil e.g. 3GPP (third generation partnership project) requirements on unwanted emissions in gaps between carriers without further digital filtering in peripheral radio units. With a sufficiently large transform, and properly determined window functions, requirements by 3GPP on uplink adjacent channel selectivity and in-band blocking can also be fulfilled without any digital filters in the peripheral radio units. The implicit filtering performed by nulling of transform frequency bins can also relax filters on the encoder side and/or the decoder side.

Carriers with different power spectral density (e.g. using same transmit power for different carrier bandwidth) can still get similar performance (e.g. Error Vector Magnitude, Adjacent Channel Leakage Ratio) by applying individual bin scaling before quantization. This is also useful in uplink, e.g. for multi-standard radio applications with both LTE/NR and GSM (Global System for Mobile communication), since GSM uplink signals can have significantly higher PSD than LTE/NR. Moreover, it is easy to handle non-contiguous cases, and complexity is not increased for signals with multiple gaps.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A system for encoding and decoding complex data, the system comprising an encoder and a decoder, wherein the encoder comprises:
a processor; and
a memory storing instructions that, when executed by the processor, cause the encoder to:
obtain an input signal made up of a series of numerically represented samples;
determine a time frame of the input signal to process;
apply a first window function on data in the time frame, resulting in first windowed data, wherein the first window function tapers sample magnitude towards the edges of the first window function;
perform a windowed complex discrete Fourier-related transform on the first windowed data, resulting in frequency-domain data comprising a plurality of coefficients, keeping only the real part or the imaginary part of each coefficient;
quantize the frequency domain data resulting in quantized data;
output the quantized data as encoded data; and
repeat the instructions of the encoder, wherein in each subsequent iteration of instructions to determine, a time frame is determined that overlaps in time with a most recent preceding time frame;
and wherein the decoder comprises:
a processor; and
a memory storing instructions that, when executed by the processor, cause the decoder to:
obtain the encoded data for a time frame of data;
unpack quantization performed by the encoder;
perform a windowed complex inverse discrete Fourier-related transform on the unpacked data, resulting in time-domain data;
apply a fourth window on the time-domain data, resulting in fourth windowed data, wherein the fourth window function is determined based on the first window function;
add, in corresponding time units, the fourth windowed data to previously determined overlapping fourth windowed data of a preceding time frame;
output, as output data, the added data for time units for which all encoded data has been processed; and
repeat the instructions of the decoder, wherein in each subsequent iteration of the instructions to obtain encoded data for a time frame is obtained that overlaps in time with a most recent preceding time frame.

2. A method for encoding complex data, the method being performed in an encoder, the method comprising the steps of:
obtaining an input signal made up of a series of numerically represented samples;
determining a time frame of the input signal to process;
applying a first window function on data in the time frame, resulting in first windowed data, wherein the first window function tapers sample magnitude towards the edges of the first window function;
performing a windowed complex discrete Fourier-related transform on the first windowed data, resulting in frequency-domain data comprising a plurality of coefficients, keeping only the real part or the imaginary part of each coefficient;
quantizing the frequency domain data resulting in quantized data;
outputting the quantized data as encoded data; and
repeating the method, wherein each subsequent iteration of the step of determining a time frame comprises determining a time frame that overlaps in time with a most recent preceding time frame.

3. The method according to claim 2, wherein the step of performing a windowed complex discrete Fourier-related transform comprises applying a time shift to align aliases between neighbouring time frames.

4. The method according to claim 2, wherein the step of performing a windowed complex discrete Fourier-related transform comprises applying a frequency shift.

5. The method according to claim 2, further comprising the step of:
discarding coefficients in the second windowed data that are likely to be less than a threshold.

6. The method according to claim 2, further comprising the step of:
scaling frequency components in the second windowed data.

7. The method according to claim 2, further comprising the step of:
entropy encoding the quantized data;
and wherein the step of outputting comprises outputting the entropy encoded quantized data.

8. The method according to claim 2, wherein the overlap is 50 percent of a time frame length.

9. The method according to claim 2, wherein the samples are IQ, in-phase and quadrature, samples of a baseband signal for wireless communication.

10. An encoder for encoding complex data, the encoder comprising:
a processor; and
a memory storing instructions that, when executed by the processor, cause the encoder to:
obtain an input signal made up of a series of numerically represented samples;
determine a time frame of the input signal to process;
apply a first window function on data in the time frame, resulting in first windowed data, wherein the first window function tapers sample magnitude towards the edges of the first window function;
perform a windowed complex discrete Fourier-related transform on the first windowed data, resulting in frequency-domain data comprising a plurality of coefficients, keeping only the real part or the imaginary part of each coefficient;
quantizing the frequency domain data resulting in quantized data;
output the quantized data as encoded data; and
repeat said instructions, wherein each subsequent iteration of the instructions to determine a time frame comprise instructions that, when executed by the processor, cause the encoder to determine a time frame that overlaps in time with a most recent preceding time frame.

11. The encoder according to claim 10, wherein the instructions to perform a windowed complex discrete Fourier-related transform comprise instructions that, when executed by the processor, cause the encoder to applying a time shift to align aliases between neighbouring time frames.

12. The encoder according to claim 10, wherein the instructions to perform a windowed complex discrete Fourier-related transform comprise instructions that, when executed by the processor, cause the encoder to apply a frequency shift.

13. The encoder according to claim 10, further comprising instructions that, when executed by the processor, cause the encoder to:
discard coefficients in the second windowed data that are likely to be less than a threshold.

14. The encoder according to claim 10, further comprising instructions that, when executed by the processor, cause the encoder to:
scale frequency components in the second windowed data.

15. The encoder according to claim 10, further comprising instructions that, when executed by the processor, causes the encoder to:
entropy encode the quantized data;
and wherein the instructions to output comprise instructions that, when executed by the processor, cause the encoder to output the entropy encoded quantized data.

16. The encoder according to claim 10, wherein the overlap is 50 percent of a time frame length.

17. The encoder according to claim 10, wherein the samples are IQ, in-phase and quadrature, samples of a baseband signal for wireless communication.

18. A computer program product comprising a non-transitory storage medium including program code to be executed by at least one processor of an encoder, the computer program product comprising program code, whereby execution of the program code causes the encoder to:
obtain an input signal made up of a series of numerically represented samples;
determine a time frame of the input signal to process;
apply a first window function on data in the time frame, resulting in first windowed data, wherein the first window function tapers sample magnitude towards the edges of the first window function;
perform a windowed complex discrete Fourier-related transform on the first windowed data, resulting in frequency-domain data comprising a plurality of coefficients, keeping only the real part or the imaginary part of each coefficient;
quantizing the frequency domain data resulting in quantized data;
output the quantized data as encoded data; and
repeat said instructions, wherein each subsequent iteration of the instructions to determine a time frame comprise instructions that, when executed by the processor, cause the encoder to determine a time frame that overlaps in time with a most recent preceding time frame.

19. A method for decoding encoded complex data, the method being performed in a decoder, the method comprising the steps of:
obtaining encoded data for a time frame of data;
unpacking quantization performed by the encoder;
performing a windowed complex inverse discrete Fourier-related transform on the unpacked data, resulting in time-domain data;
applying a fourth window on the time-domain data, resulting in fourth windowed data, wherein the fourth window function is determined based on a first window function applied in generating the encoded data;
adding, in corresponding time units, the fourth windowed data to previously determined overlapping fourth windowed data of a preceding time frame;
outputting, as output data, the added data for time units for which all encoded data has been processed as a series of numerically represented samples; and
repeating the method, wherein each subsequent iteration of the step of obtaining comprises obtaining encoded data for a time frame that overlaps in time with a most recent preceding time frame.

* * * * *